United States Patent
Vemuri et al.

(10) Patent No.: US 12,501,355 B2
(45) Date of Patent: Dec. 16, 2025

(54) METHOD AND SYSTEM FOR SMART GUIDED SELECTION OF NETWORKS

(71) Applicant: GM Global Technology Operations LLC, Detroit, MI (US)

(72) Inventors: Venkata Naga Siva Vikas Vemuri, Farmington Hills, MI (US); Prakash M. Peranandam, Rochester Hills, MI (US); Andrew J. MacDonald, Grosse Pointe Park, MI (US); Sitaram Emani, Novi, MI (US); John Sergakis, Bloomfield Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 284 days.

(21) Appl. No.: 18/506,599

(22) Filed: Nov. 10, 2023

(65) Prior Publication Data
US 2025/0159598 A1    May 15, 2025

(51) Int. Cl.
*H04W 48/18* (2009.01)
*H04W 24/02* (2009.01)

(52) U.S. Cl.
CPC .......... *H04W 48/18* (2013.01); *H04W 24/02* (2013.01)

(58) Field of Classification Search
None
See application file for complete search history.

(56) References Cited

U.S. PATENT DOCUMENTS

| | | | | |
|---|---|---|---|---|
| 9,843,901 | B2* | 12/2017 | Mihály | H04W 4/48 |
| 10,827,421 | B2* | 11/2020 | Li | H04W 48/18 |
| 2017/0257742 | A1* | 9/2017 | Mihály | H04W 4/023 |
| 2017/0325179 | A1* | 11/2017 | Ameixieira | H04W 52/28 |
| 2019/0261236 | A1* | 8/2019 | Wang | H04W 36/04 |
| 2019/0327690 | A1* | 10/2019 | Ameixieira | H04W 52/226 |
| 2019/0357136 | A1* | 11/2019 | Li | H04W 48/18 |
| 2020/0187070 | A1* | 6/2020 | Wang | H04W 48/18 |
| 2020/0220602 | A1* | 7/2020 | Li | H04B 7/0684 |
| 2025/0159598 | A1* | 5/2025 | Vemuri | H04W 48/18 |

* cited by examiner

*Primary Examiner* — Faiyazkhan Ghafoerkhan
(74) *Attorney, Agent, or Firm* — Vivacqua Crane, PLLC

(57) ABSTRACT

A method for smart guided selection of networks includes detecting a wireless connectivity issue between. The in-vehicle network device is inside a vehicle, and the network access device may be inside or outside the vehicle. The method further includes receiving network data. The network data includes a list of available networks and network performance characteristics of each of the available networks. The method includes predicting, using machine learning, quality of service (QoS) metrics of the available networks along a trip of a vehicle and selecting a one or more networks from the list of available networks for one or more in-vehicle network devices based constraint solving on the predicted QoS metrics of the list available networks and QoS constraints.

20 Claims, 2 Drawing Sheets

METHOD AND SYSTEM FOR SMART GUIDED SELECTION OF NETWORKS

INTRODUCTION

The present disclosure relates to a system and method for smart guided selection of networks.

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

In certain situations, vehicle features, vehicle applications, network devices, such as cell phones, demand certain throughput and latency constraints. To address these quality of service (QoS) constraints, the network devices may switch from one network to another. In other words, the network device may disconnect from one network and connect to another network. This network switch, however, may cause a reconnection delay. It is therefore desirable to predict connectivity quality to allow seamless handover from one network to another network even before the current connection quality degrades.

SUMMARY

The present disclosure describes a method for smart guided selection of networks. In some aspects of the present disclosure, the method includes detecting the best available wireless connectivity and enabling the vehicle appropriate NAD from list of NADs to establish the connection. The method further includes receiving network data in response to keeping a good QoS and throughput to the network access device. The network data includes a list of available networks and network performance characteristics of each of the available networks. The network performance characteristics include network throughput offering and network latency offering. The method includes predicting, using machine learning, Constraint solving the QoS metrics of the available networks along a trip of the vehicle. The method further includes selecting one or more of from the list of available networks and network technologies to determine the selected list of networks for one or more in-vehicle network devices based on the predicted QoS metrics of the available network and QoS constraints. Then, the method includes connecting one or more in-vehicle network devices to the selected list of networks.

Implementations may include one or more of the following features. The in-vehicle network device is one of a plurality of in-vehicle network devices. Each of the plurality of in-vehicle network devices is running an application. Each of the plurality of in-vehicle network devices has an individual throughput demand and an individual latency demand. The method includes receiving network-needs data. The network-needs data includes a number of the plurality of the in-vehicle network devices, the individual through demand for each of the plurality of in-vehicle network devices, and the individual latency demand for each of the plurality of in-vehicle network devices. The network performance characteristics of each of the available networks further includes a supported bandwidth of each of the available networks. The plurality of in-vehicle network devices is associated with users. The method further may include detecting a number of the users. The method further includes determining network needs and receives priorities and constraints (example no public Wi-Fi, low cost, etc.) for each of the users for the entire trip in the vehicle. The method may include receiving external factor data for each of a plurality of route segments of the navigation route of the entirety of the trip. The external factor data includes network traffic for each of the plurality of route segments, location of the vehicle for each of the plurality of route segments, seasonality for each of the plurality of route segments, time of the day for each of the plurality of route segments, and vehicle speed for each of the plurality of route segments. The QoS metrics of the available networks are predicted using the external factor data. The QoS metrics of the available networks are predicted using the external factor data and the network performance characteristics of each of the available networks. The network performance characteristics of each of the available networks and the number of users. The traffic for each of the plurality of route segments is determined either by crowdsourcing or sensors or in combination. The machine learning may be a recurrent neural network. The machine learning may include a fully connected deep neural network and a convolutional neural network. The machine learning can be either supervised or unsupervised or reinforcement learning. The plurality of deep neural network is used to predict the QoS metrics of the available networks throughout the entirety of the trip of the vehicle. The machine learning includes a convolutional neural network. The convolutional neural network is used to determine people crowd and the traffic pattern using a camera of the vehicle. Implementations of the described techniques may include hardware, a method or process, or computer software on a computer-accessible medium.

The present disclosure further describes a system for smart guided selection of networks. The system includes an in-vehicle network device and a controller in communication with the in-vehicle network device. The controller is programmed to execute the method described above.

The present disclosure also describes a tangible, non-transitory, machine-readable medium, comprising machine-readable instructions, that when executed by a processor, cause the processor to execute the method described above.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the presently disclosed system and method are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein.

DETAILED DESCRIPTION

Figure 1:
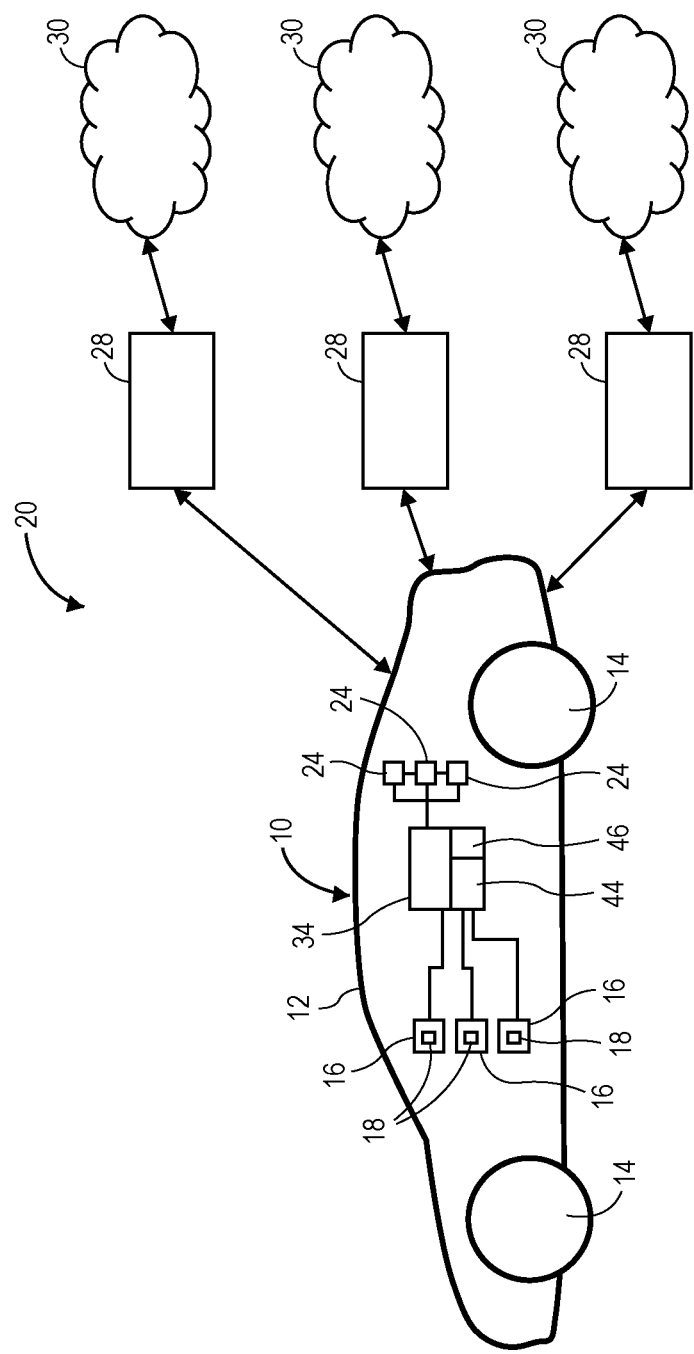
FIG. 1 is a schematic diagram of a system for smart guided selection of networks.

Reference will now be made in detail to several examples of the disclosure that are illustrated in accompanying drawings. Whenever possible, the same or similar reference numerals are used in the drawings and the description to refer to the same or like parts or steps.

With reference to FIG. 1, a vehicle 10 generally includes a body 12 and a plurality of wheels 14 coupled to the body 12. The vehicle 10 may be an autonomous vehicle. In the depicted embodiment, the vehicle 10 is depicted in the illustrated embodiment as a sedan, but it should be appreciated that other vehicles including trucks, coupes, sport utility vehicles (SUVs), recreational vehicles (RVs), airplane, helicopter, etc., may also be used.

The vehicle 10 further includes one or more sensors 24 coupled to the body 12. The sensors 24 sense observable conditions of the exterior environment and/or the interior environment of the vehicle 10. As non-limiting examples, the sensors 24 may include one or more cameras, one or more light detection and ranging (LIDAR) sensors, one or more proximity sensors, one or more cameras, one or more ultrasonic sensors, one or more thermal imaging sensors, and/or other sensors. Each sensor 24 is configured to generate a signal that is indicative of the sensed observable conditions (i.e., sensor data) of the exterior environment and/or the interior environment of the vehicle 10.

The vehicle 10 includes one or more in-vehicle network devices 16. In the present disclosure, the term "network device" means an electronic hardware configured to wirelessly connect to a network 30 and programmed to run an application of other software. As non-limiting examples, the in-vehicle network devices 16 may be a mobile phone, a computer, a tablet, an internal, integral component of the vehicle 10 (e.g., vehicle features such as GPS navigation), or any other electronic hardware configured to transmit and receive data through a network. Each of the in-vehicle networks 16 is disposed inside the vehicle 10, includes a transceiver 18, and is capable of running an application (e.g., videogame).

The vehicle 10 includes a controller 34 in communication with the sensors 24 and the in-vehicle remote network device 16. The controller 34 includes at least one processor 44 and a non-transitory computer readable storage device or media 46. The processor 44 may be a custom made or commercially available processor, a central processing unit (CPU), a graphics processing unit (GPU), an auxiliary processor among several processors associated with the vehicle controller 34, a semiconductor-based microprocessor (in the form of a microchip or chip set), a macroprocessor, a combination thereof, or generally a device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the controller 34 in controlling the vehicle 10. The controller 34 of the vehicle 10 may be referred to as a vehicle controller and may be programmed to execute methods 100, 200, and 300 (FIGS. 3-4) as described in detail below.

The instructions may include one or more separate programs, each of which comprises an ordered listing of executable instructions for implementing logical functions. The instructions, when executed by the processor 44, receive and process signals from sensors, perform logic, calculations, methods and/or algorithms for automatically controlling the components of the vehicle 10, and generate control signals to automatically control the components of the vehicle 10 based on the logic, calculations, methods, and/or algorithms. Although a single controller 34 is shown in FIG. 1, embodiments of the vehicle 10 may include a plurality of controllers 34 that communicate over a suitable communication medium or a combination of communication mediums and that cooperate to process the sensor signals, perform logic, calculations, methods, and/or algorithms, and generate control signals to automatically control features of the vehicle 10. The controller 34 is part of a system 20 for smart guided selection of networks 30.

In addition to the controller 34, the system 20 includes the vehicle, the in-vehicle network devices 16, and one or more network access devices (NADs) 28. In the present disclosure, the term "network access device" means a type of hardware device that allows computers or other network devices 16 to connect to a network 30. The NADs 28 are typically located at the edge of the network 30 and provide the interface between the network 30 and the in-vehicle network devices 16 connecting to the NAD 28. As non-limiting examples, the NADs 28 may be routers, switches, wireless access points, and modems. The NADs 28 may be inside (and part of) the vehicle 10 or outside the vehicle 10 Regardless of its location, each NAD 28 is wirelessly connected to one or more networks 30 and serves as the interface between the in-vehicle network devices 16 and the networks 30. As non-limiting examples, the networks 30 may be a cellular network, local area network (LAN), wide area network (WAN), Wi-Fi network, Internet, among others. Cellular networks may include 3G, 4G, 5G, LTE, WiMAX, among others.

The system 20 uses a wireless network device optimization models and distributes data across multiple NADs 28. Specifically, the system 20 considers factors, such as location, route, trajectory, time of the day, repeatability pattern, among others, to determine the optimal NAD data distribution. The QoS metrics are dynamically optimized for individual NADs 28 by a machine learning predictor before the best NAD 28 is selected for the application. The system 20 employs periodic mitigation based on vehicle experience data and other NAD factors.

Figure 2:
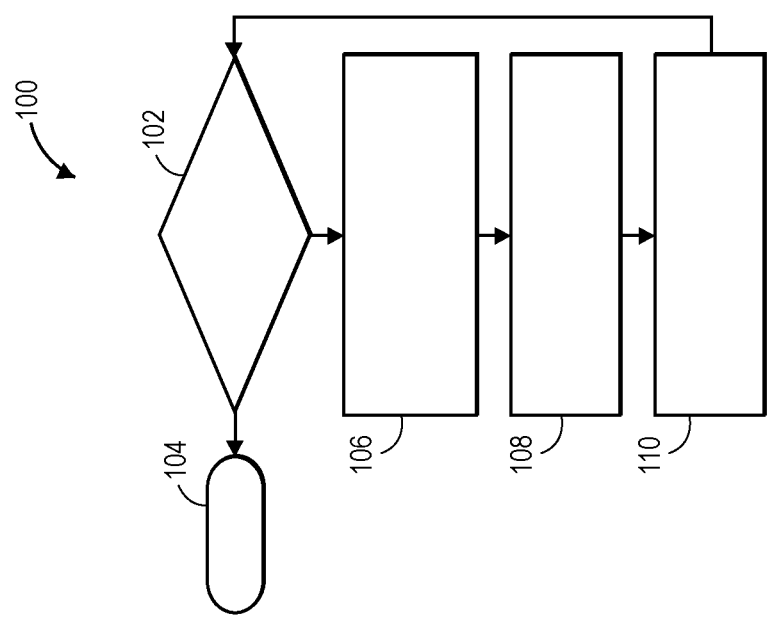
FIG. 2 is a method for smart guided selection of networks.

FIG. 2 is a flowchart of a method 100 for smart guided selection of networks 30. The method 100 begins at block 102. At block 102, the controller 34 detects whether there is a wireless connectivity issue between one or more of the in-vehicle network devices 16 one or more network access devices 28. To do so, the controller 34 may determine the Quality of Service (QoS) metrics of the network service and compare the QoS metrics of the network service with predetermined thresholds. As non-limiting examples, the QoS metrics of the network service may include latency, throughput, availability, jitter, among others. If one or more of the QoS metrics of the network service is less than the predetermined thresholds, a connectivity issue is detected. If the QoS metrics of the network service are equal to or greater than the predetermined thresholds, then no connectivity issue is detected. If no connectivity issue is detected, then the method 100 proceeds to block 104 and the method 100 ends. Alternatively, if no connectivity issue is detected, then the method 100 may continuously execute block 102 to monitor the connectivity between the in-vehicle network devices 16 and the network access devices 28. If a connectivity issue is detected, then the method 100 continues to block 106.

At block 106, the controller 34 receives network data. This network data includes a list of available networks 30 and the network performance characteristics of each of the available networks 30. The network performance characteristics include network throughput offering, network latency offering, and the supported bandwidth of each of the available networks, among others. Each of the networks 30 may be associated with a NAD 28. The network data may also include NAD internal datasets. The NAD internal datasets may include a readiness index and an activity index for each NAD 28. The network data may also include dynamic network datasets. The method 100 continues to block 108.

At block 108, the controller 34 uses machine learning to predict the QoS metrics of the available networks 30 along the entire trip of the vehicle 10. The machine learning algorithm may be, for example, a recurrent neural network (RNN) that deals with time series data. Alternatively, the machine learning may be a combination of a fully connected deep neural network (DNN) and a convolutional neural network (CNN) for analyzing the images to understand the traffic levels if the traffic identification is image based rather than enumerated input, which can be crowdsourced or dependent on the information on the number of network devices connected to a cell tower.

At block 108, the machine learning algorithm (e.g., DNN or RNN) may use different datasets to predict the QoS metrics of the available networks 30. For example, the machine learning algorithm may predict the QoS metrics of the available networks 30 using the external factor data, static rules, the network performance characteristics of each of the available networks, and the number of users. Static rule set may consist of preferences on cost range, user priorities and restrictions like No public Wi-Fi 33, etc. As mentioned above, the machine learning algorithm may use the navigation route of the vehicle 10 to predict the QoS metrics of the available networks 30 along the entire trip of the vehicle 10. Accordingly, the controller 34 may receive the navigation data from the vehicle 10, such as the navigation route of the vehicle 10 to reach the desired destination.

As mentioned above, the machine learning algorithm (e.g., DNN or RNN) may use dynamic external factors and parameters for each of a plurality of route segments of the navigation route of the entire trip of the vehicle 10 to predict the QoS metrics of the available networks 30 along the entire trip of the vehicle 10. The dynamic external factors and parameters may include, but are not limited to, traffic for each of the plurality of route segments, the location of the vehicle for each of the plurality of route segments, seasonality for each of the plurality of route segments, the time of the day for each of the plurality of route segments, and vehicle speed of the vehicle 10 for each of the plurality of route segments. The traffic for each of the plurality of route segments may be determined by crowdsourcing and in combination with sensors. For example, the vehicle 10 may use V2V communications to gather traffic data from other vehicles. Accordingly, at block 108, the controller 34 receives the dynamic external factors and parameters for each of a plurality of route segments of the navigation route of the entire trip of the vehicle 10.

At block 108, as mentioned above, the machine learning algorithm (e.g., RNN or DNN) may use the network needs to predict the QoS metrics of the available networks 30 along the entire trip of the vehicle 10. To do so, the controller 34 may receive network-needs data. The network-needs data may include includes determining network needs for each of the users for the entire trip of the vehicle 10. The network needs of each user may depend on the applications running on each of the in-vehicle network devices 16. The applications may include, but are not limited to, GPS navigation, online meeting application with video, email application, social medial application, music application, among others. Each of the in-vehicle network devices 16 have an individual through demand and an individual latency demand. After predicting the QoS metrics of the available networks 30 along the entire trip of the vehicle 10, the machine learning algorithm ranks the top available networks based on all the discussed different factors, the method 100 continues to block 110.

At block 110, the controller 34 selects one or more networks 30 (i.e., the selected network) of the list available networks 30 for the in-vehicle network devices 16 based on the QoS metrics of the available network along the entire trip of the vehicle 10 as predicted and ranked by the machine learning algorithm (e.g., RNN or DNN). The selection of the network 30 may also depend on a QoS rule set. QoS rule set is a list of rules based on the network service requirements (QoS requirements) by each of the apps running on the in-vehicle network devices 16. The selection of the network 30 may also depend on a NAD performance rule set. The NAD performance rule set includes rules based on whether the NAD performance characteristics will enable the proper functioning of the applications running on the in-vehicle network devices 16. The NAD performance characteristics may include availability, delay, loss, and utilization. The availability of the NAD 28 may depend on the connectivity and functionality. The delay characteristics of the NAD 28 may include the round-trip delay and the delay variance. The loss characteristics of the NAD 28 may include one-way loss and round-trip loss. The utilization characteristics of the NAD 28 may include bandwidth, capacity, and throughput. Once a network 30 is selected, the in-vehicle network device is connected to the selected network 30. Specifically, a seamless handover occurs to switch the connection from the current network 30 to the new selected network 30. The mapping of ranked networks (NADs) to the set of network devices can be done by constraint solving. The QoS rules and the requirements are translated as constraints and the constraint solver can solve for all the subset of network devices to one of the ranked NADs. The best feasible mapping will be selected for the seamless network handover. For example, all the network devices can be mapped to network 1 or subset of network devices can be mapped to network 1 and the other subset of network devices can be connected to network 2. The scheduling predictor will handover wireless technology based on the application need and predictive feature requirements for guaranteed bitrate (GBR), delay critical tasks, and non-GBR best effort needs. The controller 34 may generate a list of best set of networks 30 and prioritize the networks based on QoS thresholds (e.g., throughput thresholds and latency threshold). Some applications may use one network 30, and another application may use another network 30 based on QoS thresholds and cost constraints. The method 100 then returns to block 102.

Figure 3:
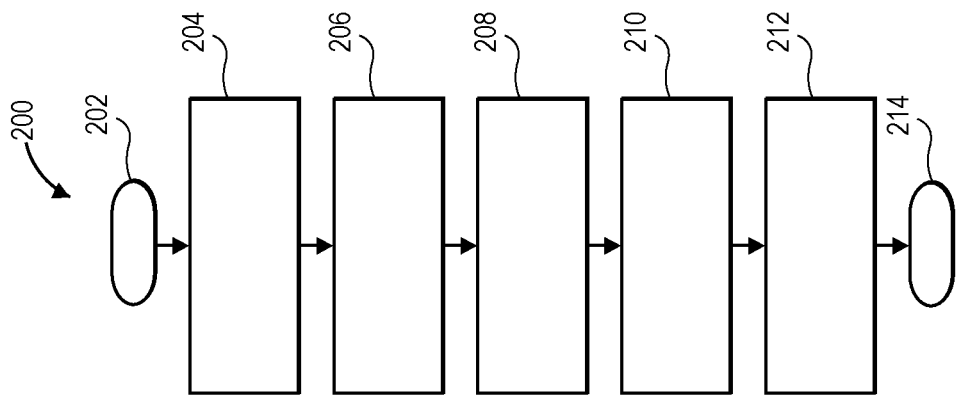
FIG. 3 is a method for collecting data about available networks.

FIG. 3 is a method 200 for collecting data about available networks as described above with respect to block 106 of FIG. 2. The method 200 begins at block 202. The method 200 then continues to block 204. At block 204, the controller 34 collects the list of available networks 30 for the current navigation segment along with the network performance characteristics of each of the available networks 30. The network performance characteristics include network throughput offering, network latency offering, the supported bandwidth, connectivity, and supported throughput of each of the available networks. The available networks 30 may include a home Wi-Fi network, a public Wi-Fi network, a 5G network, a 4G network, etc. Then, the method 200 continues to block 206.

At block 206, the controller 34 retrieves the navigation route of the vehicle 10. Alternatively, the controller 34 selects a time-based regular route (e.g., route to office, route to school, etc.). The navigation route may be retrieved from the navigation application. The navigation route may be determined be based on an appointment or a time-based regular route. Once the vehicle arrives at the destination, the vehicle Wi-Fi shall be predicted to cut off therefore switching to different NAD can be triggered. Then, the method 200 continues to block 208.

At block 208, the controller 34 selects the available network 30 for the next navigation segment along with the network performance characteristics of each of the available networks 30. The network performance characteristics include network throughput offering, network latency offering, the supported bandwidth, connectivity, and supported throughput of each of the available networks. The available networks 30 may include a home Wi-Fi network, a public Wi-Fi network, a 5G network, a 4G network, etc. Then, the method 200 continues to block 210.

At block 210, the controller 34 detects the number of users. To do so, the controller 34 may receive user data from, for example, a body control module (BCM) of the vehicle 10. The user data may include the number of vehicle doors opened, images captured by the vehicles, data from seat pressure sensors, the seat belt usage, the vehicle BLUETOOTH access information, and/or Wi-Fi access information, or using interior camera, etc. Then, the method 200 continues to block 212.

At block 212, the controller 34 determines the network needs for each of the users for the entire trip in the vehicle 10. To do so, the controller 34 may first collect the individual user individual network needs and then the overall network needs for all the user in the vehicle 10 is estimated. The individual user individual network needs may depend on the applications that a user will use over the entire trip of the vehicle 10. Specifically, the individual user individual network needs may be determined by accessing the electronic calendar of each user and the applications running on the in-vehicle network device 16 of each users. For example, the electronic calendar of a user may indicate that he or she has an online video meeting that requires specific network needs during the trip of the vehicle 10. The user may also be running music or video application on their in-vehicle network devices 16. Further, the controller 34 may use a regular usage learner application to determine the network needs of each user. Each user may be running different applications in their in-vehicle network devices 16, such as online video meeting applications, email, GPS navigation application, music application, etc. The collection of the available networks 30 may be limited by user-implemented constraints. For example, the user may not allow the online video meeting application to use public Wi-Fi networks. Then, the method 200 continues at block 214. At block 214, the method 200 ends.

Figure 4:
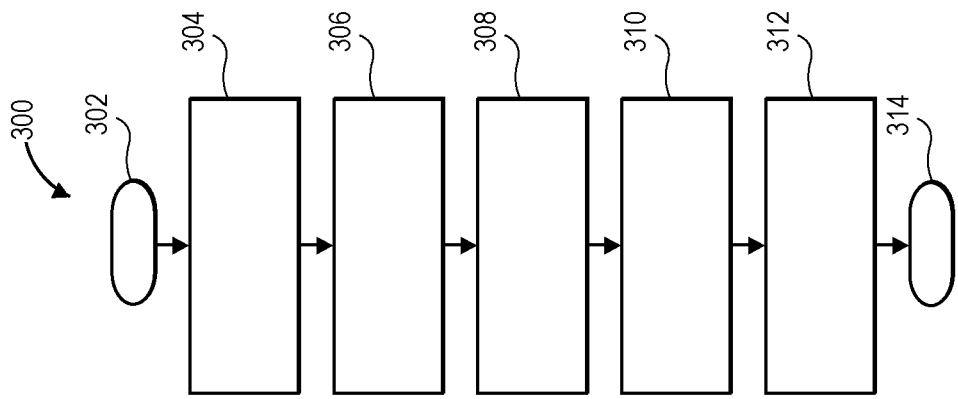
FIG. 4 is a feedback method for determining connectivity issues.

FIG. 4 is a feedback method 300 for determining connectivity issues as discussed above with respect to block 102 of FIG. 1. The method 300 begins at block 302. Then, the method 300 continues to block 304. At block 304, the controller 34 detects QoS issues with applications running on the in-vehicle network devices 16. Then, the method 300 proceeds to block 306. At block 306, the controller 34 generates a feedback trigger in response to detecting QoS issues with applications running on the in-vehicle network devices 16. Then, the method 300 continues to block 308. At block 308, the controller 34 identifies the right feedback question and then asks the user that feedback questions through, for example, a user interface of the vehicle 10. The feedback question may be: Did you witness any connectivity issue with your network?" The user then answers the feedback questions. The method 300 continues to block 310. At block 310, the controller 34 collects the answers to the feedback question and trigger-related and dependent questions if required. The method 300 then proceeds to block 312. At block 312, the controller 34 analyzes the answers to the feedback questions and alters the constraints and the QoS thresholds if required. The controller 34 may also recommend alternative networks 30 with conditions. For example, the networks 30 may be filtered out based on a rule set, profile settings, etc. As non-limiting examples, the QoS thresholds may include a throughput threshold and a latency threshold. The current throughput and the latency thresholds may be changed to more appropriate values to accommodate the network uncertainties.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the presently disclosed system and method that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

The drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure in any manner.

Embodiments of the present disclosure are described herein. It is to be understood, however, that the disclosed embodiments are merely examples and other embodiments can take various and alternative forms. The figures are not necessarily to scale; some features could be exaggerated or minimized to display details of particular components. Therefore, specific structural and functional details disclosed herein are not to be interpreted as limiting, but merely as a representative basis for teaching one skilled in the art to variously employ the presently disclosed system and method. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Embodiments of the present disclosure may be described herein in terms of functional and/or logical block components and various processing steps. It should be appreciated that such block components may be realized by a number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with a number of systems, and that the systems described herein are merely exemplary embodiments of the present disclosure.

For the sake of brevity, techniques related to signal processing, data fusion, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that alternative or additional functional relationships or physical connections may be present in an embodiment of the present disclosure.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A method for selecting network access devices, comprising:
    receiving network data, wherein the network data includes a list of available networks and network performance characteristics of each of the available networks, and the network performance characteristics include network throughput offering and network latency offering;
    predicting, using machine learning, rule set, Quality of Service (QoS) metrics of the available networks along a trip of a vehicle; and
    selecting one or more from the list of available networks to determine a selected list of networks from the list of available networks for one or more in-vehicle network devices based on the predicted QoS metrics of the available network and QoS constraints; and
    connecting the one or more in-vehicle network devices to the selected network.

2. The method of claim 1, further comprising prioritizing the list of available networks based on the QoS metrics, wherein the in-vehicle network device is one of a plurality of in-vehicle network devices, each of the plurality of in-vehicle network devices is running an application, each of the plurality of in-vehicle network devices has an individual through demand and an individual latency demand, and the method includes receiving network-needs data, and the network-needs data includes a number of the plurality of the in-vehicle network devices, the individual through demand for each of the plurality of in-vehicle network devices, and the individual latency demand for each of the plurality of in-vehicle network devices.

3. The method of claim 2, further comprising receiving a navigation route of the vehicle, wherein the network performance characteristics of each of the available networks further includes a supported bandwidth of each of the available networks.

4. The method of claim 3, wherein the plurality of in-vehicle network devices is associated with users, and the method further comprises detecting a number of the users, and receiving network-needs data includes determining network needs for each of the users for an entirety of the trip in the vehicle.

5. The method of claim 4, further comprising receiving external factor data for each of a plurality of route segments of the navigation route of the entirety of the trip, and the external factor data includes traffic for each of the plurality of route segments, location of the vehicle for each of the plurality of route segments, seasonality for each of the plurality of route segments, time of the day for each of the plurality of route segments, and vehicle speed for each of the plurality of route segments, and the QoS metrics of the available networks are predicted using on the external factor data.

6. The method of claim 5, wherein the QoS metrics of the available networks are predicted using the external factor data and the network performance characteristics of each of the available networks.

7. The method of claim 6, wherein the QoS metrics of the available networks are predicted using the external factor data, the network performance characteristics of each of the available networks, and the number of users and the associated preference rules.

8. The method of claim 7, wherein the traffic for each of the plurality of route segments is determined by crowdsourcing, and the machine learning is a recurrent neural network.

9. The method of claim 7, wherein the machine learning includes a recurrent neural network and fully connected deep neural network and a convolutional neural network, The machine learning can be either supervised or unsupervised or reinforcement learning the deep neural network is used to predict and rank the QoS metrics of the available networks guided by the restriction from the rule set along the entirety of the trip of the vehicle.

10. The method of claim 9, wherein the machine learning includes a convolutional neural network, wherein the convolutional neural network is used to determine traffic pattern using a camera of the vehicle.

11. A system for selecting network access devices from the priority list using the constraint solving method, comprising:
    an in-vehicle network device; and
    a controller in communication with the in-vehicle network device, wherein the controller is programmed to:
        detect a wireless connectivity issue between the in-vehicle network device and a network access device, wherein the in-vehicle network device is inside a vehicle;
        in response to detecting a wireless connectivity issue between the in-vehicle network device and the network access device, receive network data, wherein the network data includes a list of available networks and network performance characteristics of each of the available networks, and the network performance characteristics include network throughput offering and network latency offering;

predict, using machine learning, Quality of Service (QoS) metrics of the available networks along a trip of the vehicle;

select a selected network of the list of available networks for the in-vehicle network device based on the predicted QoS metrics of the available network; and connect the in-vehicle network device to the selected network.

12. The system of claim 11, wherein the in-vehicle network device is one of a plurality of in-vehicle network devices, each of the plurality of in-vehicle network devices is running an application, each of the plurality of in-vehicle network devices has an individual through demand and an individual latency demand, and the controller is further programmed to receive network-needs data, and the network-needs data includes a number of the plurality of the in-vehicle network devices, the individual through demand for each of the plurality of in-vehicle network devices, and the individual latency demand for each of the plurality of in-vehicle network devices.

13. The system of claim 12, wherein the controller is further programmed to receive a navigation route of the vehicle, wherein the network performance characteristics of each of the available networks further includes a supported bandwidth of each of the available networks.

14. The system of claim 13, wherein the plurality of in-vehicle network devices is associated with users, and the controller is further programmed to detect a number of the users, and receiving network-needs data includes determining network needs for each of the users for an entirety of the trip in the vehicle.

15. The system of claim 14, wherein the controller is programmed to receive external factor data for each of a plurality of route segments of the navigation route of the entirety of the trip, and the external factor data includes traffic for each of the plurality of route segments, location of the vehicle for each of the plurality of route segments, seasonality for each of the plurality of route segments, time of the day for each of the plurality of route segments, and vehicle speed for each of the plurality of route segments, and the QoS metrics of the available networks are predicted using on the external factor data.

16. The system of claim 15, wherein the QoS metrics of the available networks are predicted using the external factor data and the network performance characteristics of each of the available networks.

17. The system of claim 16, wherein the QoS metrics of the available networks are predicted using the external factor data, the network performance characteristics of each of the available networks, and the number of users.

18. The system of claim 17, wherein the traffic for each of the plurality of route segments is determined by crowdsourcing, and the machine learning is a recurrent neural network.

19. The system of claim 17, wherein the machine learning includes a fully connected deep neural network and a convolutional neural network, the deep neural network is used to predict the QoS metrics of the available networks along the entirety of the trip of the vehicle.

20. The system of claim 19, wherein the machine learning includes a convolutional neural network, wherein the convolutional neural network is used to determine traffic pattern using a camera of the vehicle.

* * * * *